United States Patent
Fevrier et al.

(10) Patent No.: US 6,262,821 B1
(45) Date of Patent: Jul. 17, 2001

(54) OPTICAL SPECTRAL MULTIPLEXER FOR INSERTING AND EXTRACTING

(75) Inventors: Hervé Fevrier, Verrieres le Buisson; Luc Berthelon, Palaiseau; Christian Coeurjolly, Vitry sur Seine; Alain Noury, Massy; Philippe Perrier, Velizy Villacoublay; Stéphane Ruggeri, Cressely, all of (FR)

(73) Assignee: Alcatel Cit, Paris (FR)

( * ) Notice: Subject to any disclaimer, the term of this patent is extended or adjusted under 35 U.S.C. 154(b) by 0 days.

(21) Appl. No.: 09/077,974
(22) PCT Filed: Oct. 18, 1996
(86) PCT No.: PCT/FR96/01638
§ 371 Date: Jun. 9, 1998
§ 102(e) Date: Jun. 9, 1998
(87) PCT Pub. No.: WO98/18231
PCT Pub. Date: Apr. 30, 1998

(51) Int. Cl.[7] .................................................. H04J 14/02
(52) U.S. Cl. ..................... 359/127; 359/124; 359/128; 359/139; 359/117; 385/24; 385/17; 370/359
(58) Field of Search ..................... 359/127, 128, 359/139, 115, 117, 124; 385/24, 17; 370/359

(56) References Cited

U.S. PATENT DOCUMENTS

| | | | |
|---|---|---|---|
| 5,612,805 | * | 3/1997 | Fevrier et al. ................ 359/124 |
| 5,701,371 | * | 12/1997 | Ishida ................ 385/17 |
| 5,867,289 | * | 2/1999 | Gerstel et al. ................ 359/110 |

FOREIGN PATENT DOCUMENTS

0592330A1   4/1994   (EP).
2739942A1   4/1997   (FR).

OTHER PUBLICATIONS

Kuo–Chun Lee et al, "Routing and Switching in a Wavelength Convertible Optical Network", IEEE INFOCOM 1993, Networking: Foundation for the Future, San Francisco, Mar. 28–Apr. 1, 1993, vol. vol. 2, Mar. 1993, Institute of Electrical & Electronics Engineers, pp. 578–585.

* cited by examiner

Primary Examiner—Jason Chan
Assistant Examiner—Chau M. Nguyen
(74) Attorney, Agent, or Firm—Sughrue, Mion, Zinn Macpeak & Seas, PLLC

(57) ABSTRACT

An extract-and-insert optical wavelength division multiplexer includes a broadcaster (D1) for applying an incoming multiplex signal to N outputs, a combiner-diffuser (D2) for broadcasting the multiplex to be inserted (MI) on N outputs, a first set of N tunable filters (FIT, ... , FNT) for selecting the carriers of the signals which are to be used for modulating the carriers of the outgoing multiplex (MS), a second set of N tunable filters (F1E, ... , FNE) for selecting the carriers which are to constitute the extracted multiplex (MT), N wavelength converter devices (CL1, ... , CLN) suitable for supplying N carriers of the outgoing multiplex (MS), and N two-input, two-output optical switches (SW1, ... , SWN) enabling each output of the broadcasters (D1, D2) to be selectively connected to the input of a filter of the first set and/or to the input of a filter of the second set, and/or to transmit the carriers of the multiplex to be inserted (MI) to a filter of the first set and/or a filter of the second set. The multiplexer is particularly applicable to optical transmission networks implementing a synchronous digital hierarchy.

6 Claims, 2 Drawing Sheets

OPTICAL SPECTRAL MULTIPLEXER FOR INSERTING AND EXTRACTING

BACKGROUND OF THE INVENTION

The invention relates to an extract-and-insert optical wavelength-division multiplexer for: receiving an incoming multiplex comprising a plurality of wavelength-division multiplexed optical carriers, extracting an extracted multiplex, and inserting a multiplex for insertion in an outgoing multiplex. Each of the multiplex to be inserted and the extracted multiplex comprises a respective plurality of optical carriers transmitted in parallel, i.e. as a wavelength-division multiplex. Each optical carrier can be modulated by a modulating signal which may comprise a plurality of channels in time-division multiplex. Such a multiplexer can be used in particular in optical transmission networks implementing a synchronous digital hierarchy.

French patent application No. 94 06984 in the name of Alcatel CIT describes such a multiplexer comprising:

- a first optical broadcaster receiving the incoming multiplex and delivering it from N outlets, where N is the maximum number of wavelengths respectively in the incoming multiplex and in the outgoing multiplex;
- a first set of N tunable filters respectively coupled to the N outlets of the first broadcaster to select E extracted carriers and T transmitted carriers in the incoming multiplex where the numbers T and E are variable and no greater than N;
- a second optical broadcaster receiving the multiplex to be inserted and delivering it from N outlets;
- a second set of N tunable filters for selecting I carriers to be inserted from the carriers constituting the multiplex to be inserted, where the I is variable and no greater than N;
- an optical combiner for wavelength-division multiplexing not more than N carriers, thereby making up an outgoing multiplex;
- N wavelength converters for supplying the combiner firstly with T new carriers respectively modulated by the signals modulating the T transmitted carriers, and secondly with I new optical carriers respectively modulated by the signals modulating the I carriers to be inserted, I+T being less than or equal to N, the N new carriers having distinct wavelengths;
- N two-input and two-output optical switches, each having:
  - a first input connected to a respective output of a filter of the first set;
  - a second input connected to a respective output of a filter of the second set;
  - a first output connected to the input of a respective one of the wavelength converters; and
  - a second output supplying an extracted carrier to constitute the extracted multiplex; and
- control means for controlling the N optical switches and the 2N tunable filters.

That known device makes it possible for the wavelengths of the carriers of the incoming multiplex and the wavelengths of the outgoing multiplex to be selected independently; and it also makes it possible for the wavelengths of the multiplex to be inserted and the wavelengths of the outgoing multiplex to be selected independently. It also makes it possible to broadcast the same signals to a plurality of destinations if each optical switch makes it possible to route a carrier both to the extracted multiplex and to the outgoing multiplex.

European patent application No. 0 592 330 in the name of Alcatel NV describes an optical switching matrix which has the advantage of being strictly non-blocking and which makes it possible to implement an insert and extract optical wavelength-division multiplexer that can be inserted in a both-way optical link (i.e. one link for each transmission direction). For each transmission direction, that optical switching matrix comprises:

- a first stage constituted by a broadcaster and a combiner-broadcaster, the broadcaster receiving an incoming multiplex constituted by four superposed carriers having distinct wavelengths and carrying modulating signals, said broadcaster delivering said multiplexer from four outputs of the broadcaster, the combiner-diffuser receiving four carriers carrying modulating signals and having mutually distinct wavelengths that are optionally identical with those of the incoming multiplex, the combiner-diffuser wavelength-division multiplexing these four carriers to make up a multiplex to be inserted, and then broadcasting a multiplex to be inserted to the four outputs of the combiner-diffuser;
- a second stage constituted by four optical switches, two of the optical switches being dedicated to the extracted multiplex and each having two inputs respectively connected to an output of the broadcaster and to an output of the combiner-broadcaster, and two other optical switches being dedicated to the outgoing multiplex and each having two inputs connected respectively to an output of the broadcaster and to an output of the combiner-broadcaster;
- a third stage constituted by first and second sets of four tunable filters, a first set being dedicated to the extracted multiplex and having four inputs connected respectively to four outputs of the two switches dedicated to the extracted multiplex and having four outputs respectively supplying four carriers enabling an extracted multiplex to be made up, the second set being dedicated to the outgoing multiplex and having four inputs respectively connected to four outputs of two switches dedicated to the outgoing multiplex and having four outputs respectively supplying four carriers;
- a fourth stage constituted by a set of four wavelength converters having four inputs respectively connected to the four outputs of the second set of filters to emit four new carriers modulated by the same modulation signals as the four carriers transmitted by the second set of filters, and enabling an outgoing multiplex to be built up; and
- control means for controlling the four optical switches and the eight tunable filters.

SUMMARY OF THE INVENTION

The object of the invention is to provide an insert-and-extract multiplexer that is strictly non-blocking and that is protected against the breakdown of a switch, of a filter, or of a wavelength converter, while still being of a structure that is simple to implement and to control.

The invention provides an insert-and-extract optical wavelength-division multiplexer for receiving an incoming multiplex and a multiplex to be inserted, and for supplying an outgoing multiplex and an extracted multiplex, each of these multiplexes comprising a plurality of optical carriers each at a wavelength that is distinct within any one multiplex, the multiplexer comprising:

- a first set of filters each tunable on any one of the possible wavelengths for carriers of the incoming multiplex and of the multiplex to be inserted, so as to select from said carriers at least those carriers which carry signals to be transmitted over the outgoing multiplex;

a second set of filters, each filter being tunable to any one of the possible wavelengths for the carriers of the incoming multiplex and of the multiplex to be inserted, to select from said carriers at least those carriers which carry signals to be transmitted over the extracted multiplex;

and transmission means for transmitting either the incoming multiplex or the multiplex to be inserted to any of the inputs to the first or second sets of filters;

the multiplexer being characterized in that the transmission means comprise a plurality of switches, each having at least a first output coupled to a respective one of the filters of the first set and at least a second output coupled to a respective one of the filters of the second set.

The multiplexer characterized in this way has the advantage of being able to include simple switches capable only of connecting an input to a single output of the switch, if there is no need simultaneously to provide transmission to the outgoing multiplex and transmission to the extracted multiplex for the same one carrier in the incoming multiplex or in the multiplex to be inserted. Also, it has the advantage of being capable of being backed up in simple manner, as appears from the description below.

BRIEF DESCRIPTION OF THE DRAWINGS

The invention will be better understood and other details that appear from the following description of an embodiment and from the accompanying figures.

DETAILED DESCRIPTION OF THE INVENTION

Figure 1:
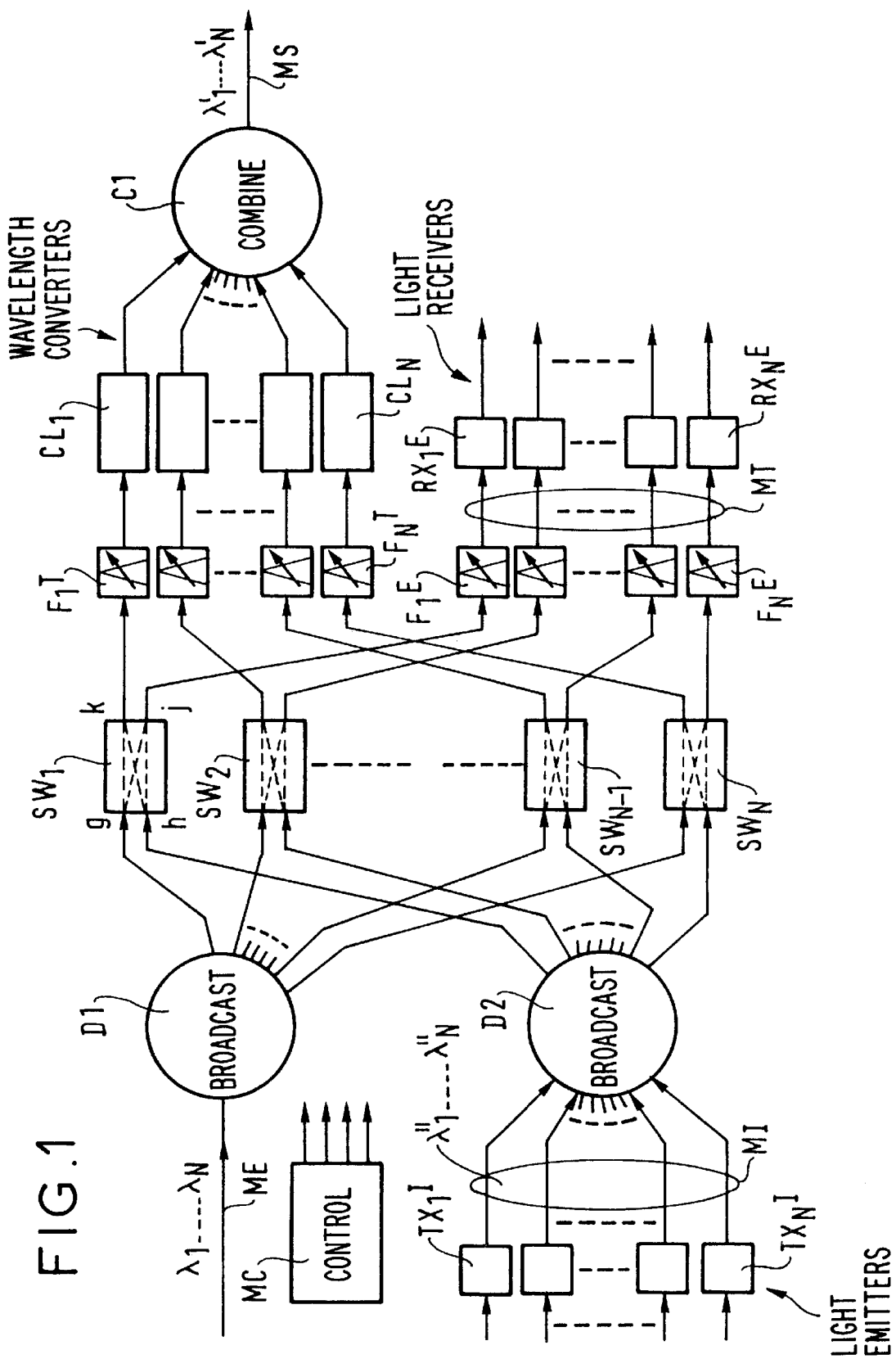
FIG. 1 is a block diagram of an embodiment of the multiplexer of the invention.

The embodiment shown in FIG. 1 comprises:

an optical broadcaster D1 having an input receiving an incoming multiplex ME constituted by superposing no more than N carriers capable of carrying modulating signals and having N respective different wavelengths $\lambda_1, \ldots, \lambda_N$, and having N outputs, each delivering the incoming multiplex;

an optical combiner-broadcaster D2 having N inputs respectively capable of receiving no more than N carriers having mutually distinct wavelengths $\lambda''_1, \ldots, \lambda''_N$ that may optionally be identical to $\lambda_1, \ldots, \lambda_N$, these N carriers capable of carrying modulated signals and constituting a multiplex to be inserted MI, and the combiner-broadcaster D2 having N outputs, each output delivering the multiplex to be inserted in the form of said N superposed carriers;

N light emitters $TX_1^I, \ldots, TX_N^I$ respectively capable of supplying the N carriers constituting the multiplex to be inserted MI, each of the emitters being capable of receiving an electrical signal representing a data stream for modulating an optical carrier that it emits, each emitter having a fixed distinct wavelength selected from the N wavelengths $\lambda''_1, \ldots, \lambda''_N$;

N optical switches $SW_1, \ldots, SW_N$, each switch comprising:

a first optical input g connected to a respective output of the broadcaster D1;

a second optical input h connected to a respective output of the combiner-broadcaster D2;

a control input connected via a link (not shown) to the output of control means MC; and a first optical output k and a second optical output j;

a first set of N optical filters $F_1^T, \ldots, F_N^T$, each filter being tunable to any one of the wavelengths $\lambda_1, \ldots, \lambda_N$, $\lambda''_1, \ldots, \lambda''_N$ of the incoming multiplex and of the multiplex to be inserted, and each having: an optical input connected to the first output k of a respective one of the switches $SW_1$ to $SW_N$, a control input connected via a link (not shown) to an output of the control means MC, and an optical output;

a second set of N tunable optical filters $F_1^E, F_N^E$, each filter being tunable to any one of the wavelengths $\lambda_1, \ldots, \lambda_N, \lambda''_1, \ldots, \lambda''_N$ of the incoming multiplex and of the multiplex to be inserted, and each having: an optical input connected to the second output j of a respective one of the switches $SW_1, \ldots, SW_N$, a control input connected via a link (not shown) to an output of the control means MC, and an optical output, the set of N outputs from these filters being capable of supplying N carriers for constituting an extracted multiplex MT;

a set of N wavelength converters $CL_1, \ldots, CL_N$, each converter being constituted, for example, by an optical receiver followed by an optical emitter and having a fixed and distinct wavelength selected from N mutually distinct wavelengths $\lambda'_1, \ldots, \lambda'_N$ that may optionally be identical to $\lambda_1, \ldots, \lambda_N$ or to $\lambda''_1, \ldots, \lambda''_N$, the input of each receiver being connected to the output from a respective one of the filters $F_1^T, \ldots, F_N^T$;

an optical combiner C1 having N inputs, each input being connected to a respective output from one of the converters $CL_1, \ldots, CL_N$, and having an output delivering an outgoing multiplex MS constituted by superposing carriers of wavelengths $\lambda\vartheta_1, \ldots, \lambda'_N$; and a set of N light receivers $RX_1^E, \ldots, RX_N^E$, each having an input connected to the output from a respective one of the filters $F_1^E, \ldots, F_N^E$ of the second set, and each having an output supplying an electrical signal representing the data transmitted via the carrier received on the input of the receiver.

In this structure, the switches $SW_1, \ldots, SW_N$ are not dedicated to constituting a single multiplex, whether outgoing or extracted. Each of the switches $SW_1, \ldots, SW_N$ can transmit the incoming multiplex ME and the multiplex to be inserted MI. This can take place either towards a filter of the first set $F_1^T, \ldots, F_N^T$ or towards a filter of the second set $F_1^E, \ldots, F_N^E$, or towards both filters simultaneously, depending on the type of switch used. The switches can be used to perform these two functions in alternation or simultaneously.

If there is no need to transmit the same carrier simultaneously to the outgoing multiplex MS and to the extracted multiplex MT, then the switches $SW_1, \ldots, SW_N$ can be switches having two states only:

in a first state, the input g is connected to the output k and the input h is connected to the output j;

and in a second state, the input h is connected to the output k and in the input g is connected to the output j.

If it is necessary to be able to transmit a single carrier simultaneously towards the outgoing multiplex MS and towards the extracted multiplex MT, then each switch must be capable of taking up four states, the two states described above plus the following two additional states:

in a third state, the input g is connected simultaneously to the outputs k and j;

and in a fourth state, the input h is connected simultaneously to the outputs k and j.

Each wavelength converter $CL_1, \ldots, CL_N$ serves to receive a carrier that can carry a modulating signal and having a wavelength $\lambda_1, \ldots, \lambda_N$ or $\lambda''_1, \ldots, \lambda''_N$, and to emit a new carrier modulated, where appropriate, by said modulating signal, and having a fixed wavelength selected from $\lambda'_1, \ldots, \lambda'_N$. These wavelength converters make it possible to select the set of wavelengths $\lambda_1, \ldots, \lambda_N$ independently from the set of wavelengths $\lambda''_1, \ldots, \lambda''_N$ and the set of wavelengths $\lambda'_1, \ldots, \lambda'_N$.

The scope of the invention is not restricted to embodiments in which each of the incoming multiplex, the outgoing multiplex, the multiplex to be inserted, and the extracted multiplex has the same maximum number of wavelengths. For N 2×2 switches (or functionally equivalent means), each of the incoming multiplex and the outgoing multiplex has no more than N carriers. It is possible to insert I carriers whatever the value of the number I so long as it is less than or equal to N, and to extract E carriers whatever the value of the number E so long as it is less than or equal to N. The number of emitters $TX^I$ and the number of inputs on the combiner-broadcaster D2 can each be as small as I. The number of receivers $RX^E$ and the number of filters $F^E$ can each be as small as E.

The person skilled in the art is capable of adapting the multiplexer of the invention to make it suitable for inserting in a both-way link (one link in each transmission direction). By way of example, it would be possible to use 4×4 switches that are common to both links, as described in above-mentioned document EP 0 592 330.

In some applications, the combiner-broadcaster D2 can be constituted by a combiner and a broadcaster that are distinct and optionally remote one from the other. All or some of the emitters $TX_1^I, \ldots, TX_N^I$ and of the receivers $RX_1^E, \ldots, RX_N^E$ may be remote from the other elements constituting the multiplexer.

Figure 2:
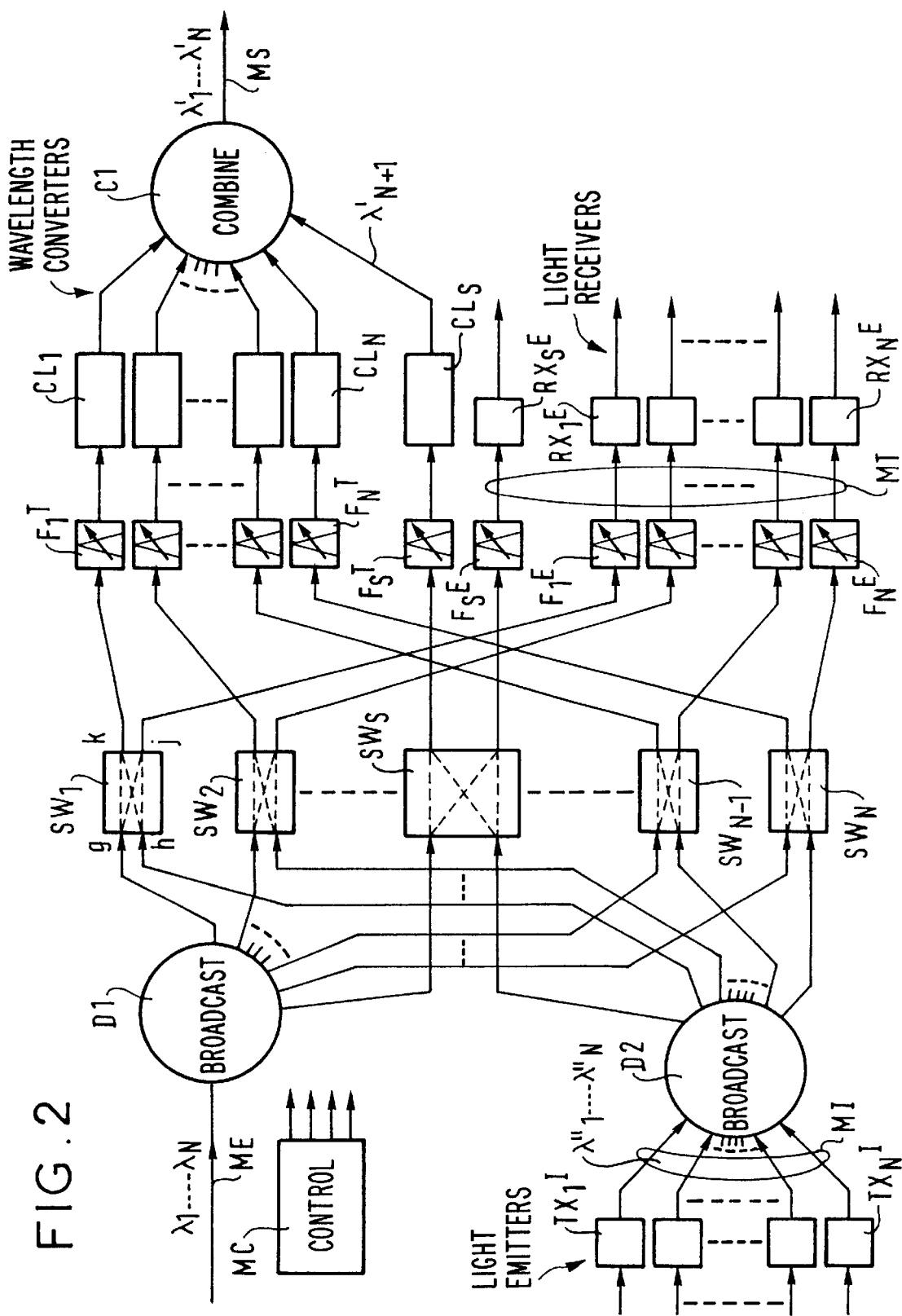
FIG. 2 is a block diagram of the same embodiment with additional means to constitute a backup path.

FIG. 2 is a block diagram of the same embodiment but associated with additional means making it possible to remedy a breakdown in one of the tunable filters $F_1^T, \ldots, F_N^T$, and $F_1^E, \ldots, F_N^E$, or a breakdown in one of the converters $CL_1, \ldots, CL_N$, or a breakdown in one of the optical receivers $RX_1^E, \ldots, RX_N^E$, or a breakdown in one of the switches $SW_1, \ldots, SW_N$. These additional means comprise:

an additional output from the broadcaster D1 and an additional output from the combiner-diffuser D2;

an additional optical switch $SW_S$ analogous to the other switches $SW_1, \ldots, SW_N$ and having: a first optical input connected to the additional output of the broadcaster D1, a second optical input connected to the additional output of the combiner-broadcaster D2, a control input connected via a link (not shown) to an additional output of the control means MC, a first output, and a second output;

an additional filter $F_S^T$ having an input connected to the first output of the additional switch $SW_S$, a control input connected via a link (not shown) to an additional output of the control means MC, and an output;

an additional wavelength converter CLs having an optical input connected to the output of the additional filter $F_S^T$ and having an optical output supplying a carrier having a fixed wavelength $\lambda'_{N+1}$, which is either different from the wavelengths $\lambda'_1, \ldots, \lambda'_N$ if the converter $CL_S$ has a fixed output wavelength, or else is selected to be equal to one of the wavelengths $\lambda'_1, \ldots, \lambda'_N$, if the converter $CL_S$ has a tunable output wavelength;

an additional input on the optical combiner C1 connected to the output of the additional converter $CL_S$;

an additional second tunable filter $F_S^E$ having an optical input connected to the second output from the additional switch $SW_S$, a control input connected via a link (not shown) to an additional output of the control means MC, and an output supplying a carrier forming a portion of the extracted multiplex MT; and an optical receiver $RX_S^E$ having an input connected to the output of the second additional filter $F_S^E$, and having an output supplying an electrical signal.

In the event of one of the switches $SW_1, \ldots, SW_N$ breaking down, the faulty switch can be replaced functionally by the additional switch $SW_S$ by giving the additional switch the control signals that would otherwise be applied to the faulty switch. Control is thus very simple to implement.

In the event of one of the filters $F_1^T, \ldots, F_N^T$ breaking down or of one of the converters $CL_1, \ldots, CL_N$ breaking down, then the filter-converter pair including the faulty element is functionally replaced by the pair constituted by the additional filter $F_S^T$ and the converter $CL_S$, and the control signals that would normally have been applied to the switch connected to the pair that includes a faulty element are applied to the additional switch $SW_S$. Control is thus very simple to implement.

In the event of a breakdown in one of the filters $F_1^E, \ldots, F_N^E$ or in one of the optical receivers $RX_1^E, \ldots, RX_N^E$, the filter-receiver pair including a faulty element is functionally replaced by the additional filter $F_S^E$ and the additional receiver $RX_S^E$, with the additional switch $SW_S$ being controlled by the control signals that would normally have been applied to the switch connected to the pair including a faulty element. Control is thus very simple to implement.

It will be observed that in this embodiment, nothing is provided to remedy a breakdown of one of the emitters $TX_1^I, \ldots, TX_N^I$. If it is further desired to be able to remedy such a breakdown, it is possible to add further additional means (not shown) comprising an additional emitter connected to an additional input of the combiner-broadcaster D2 and supplying it with a carrier of wavelength $\lambda''^1_{N+1}$ which is either different from all of the wavelengths $\lambda''_1, \ldots, \lambda''_N$, if the additional emitter is of fixed wavelength, or else is selected to be equal to one of the wavelengths $\lambda''_1, \ldots, \lambda''_N$ if said additional emitter has a wavelength that is tunable.

Naturally, a larger number of additional elements (switches, filters, converters, emitters, receivers) can be provided by adapting the number of outputs from the broadcaster D1 and from the combiner-broadcaster D2, and by adapting the number of inputs to the combiner-diffuser D2 and to the combiner C1, and also by adapting the control means MC.

It should be observed that the fact that each switch provides access equally well to the outgoing multiplex MS and to the extracted multiplex MT gives rise to two advantageous consequences:

there is no need to use four-state switches unless it is desired to implement simultaneous transmission of the same carrier both to the outgoing multiplex and to the extracted multiplex; and it is possible to remedy a breakdown in one of the switches by means of a single additional switch. It is thus simple to implement means that provide protection against a breakdown.

What is claimed is:

1. An insert-and-extract optical wavelength-division multiplexer for receiving an incoming multiplexed signal (ME) and a multiplexed signal to be inserted (MI), and for supplying an outgoing multiplexed signal (MS) and an extracted multiplexed signal (MT), each of these multiplexed signals comprising a plurality of optical carriers each at a wavelength that is distinct within any one multiplexed signal, the multiplexer comprising:

a first set of filters ($F_1^T, \ldots, F_N^T$) each tunable on any one of the possible wavelengths ($\lambda_1, \ldots, \lambda_N, \lambda''_1, \ldots, \lambda''_N$) for carriers of the incoming multiplexed signal and of the multiplexed signal to be inserted, so as to select from said carriers at least those carriers which carry signals to be transmitted over the outgoing multiplexed signal (MS);

a second set of filters ($F_1^E, \ldots, F_N^E$), each filter being tunable to any one of the possible wavelengths ($\lambda_1, \ldots, \lambda_N, \lambda''_1, \ldots, \lambda''_N$) for the carriers of the incoming multiplexed signal and of the multiplexed signal to be inserted, to select from said carriers at least those carriers which carry signals to be transmitted over the extracted multiplexed signal (MT); and a transmitter (D1, D2, $SW_1, \ldots, SW_N$) for transmitting either the incoming multiplexed signal (ME) or the multiplexed signal to be inserted (MI) to any of the inputs to the first or second sets of filters ($F_1^T, \ldots, F_N^T$; $F_1^E, \ldots, F_N^E$);

the multiplexer being characterized in that the transmitter comprises a plurality of switches ($SW_1, \ldots, SW_N$), each having at least a first output (k) coupled to a respective one of the filters of the first set ($F_1^T, \ldots, F_N^T$) and at least a second output (j) coupled to a respective one of the filters of the second set ($F_1^E, \ldots, F_N^E$).

2. A multiplexer according to claim 1, characterized in that each switch ($SW_1, \ldots, SW_N$) makes it possible to connect any one of its inputs (g, h) simultaneously to a first output (k) of the switch and to a second output (j) of the same switch.

3. A multiplexer according to claim 1, for an incoming multiplexed signal, an outgoing multiplexed signal, a multiplexed signal to be inserted, and an extracted multiplexed signal each comprising no more than N carriers having wavelengths that are distinct within any given multiplexed signal, the multiplexer being characterized in that each of the switches comprises N individual switches ($SW_1, \ldots, SW_N$) each having: two optical inputs (g, h), a first optical output (k), a second optical output (j), and a control input.

4. A multiplexer according to claim 1, characterized in that the transmitter (D1, D2, $SW_1, \ldots, SW_N$) further comprises:

a first broadcaster broadcasting the incoming multiplexed signal (ME) over N first broadcaster outputs; and a second broadcaster broadcasting the multiplexed signal to be inserted (MI) over N second broadcaster outputs;

and in which said switches ($SW_1, \ldots, SW_N$) comprise: N inputs (g) connected to N respective outputs of the first broadcaster (D1), N inputs (h) connected to N respective outputs of the second broadcaster (D2), a control input, N first outputs (k), and N second outputs (j).

5. A multiplexer according to claim 4, characterized in that to make it possible to remedy a breakdown, it further comprises:

at least one additional output on the first broadcaster (D1);

at least one additional output on the second broadcaster (D2);

at least one additional switch ($SW_S$) having two additional inputs, a first additional output and a second additional output;

at least one additional first filter ($F_S^T$) tunable to any one of the possible wavelengths ($\lambda_1, \ldots, \lambda_N, \lambda''_1, \ldots, \lambda''_N$) for the carriers of the incoming multiplexed signal and of the multiplexed signal to be inserted and having an input connected to the first output of the additional switch (SWS), a control input, and an output; and at least one additional second filter ($F_S^E$) tunable to any one of the possible wavelengths ($\lambda_1, \ldots, \lambda_N, \lambda''_1, \ldots, \lambda''_N$) for the carriers of the incoming multiplexed signal and of the multiplexed signal to be inserted, and having: an input connected to the second output of the additional switch, and an output supplying a carrier to make up a portion of the extracted multiplexed signal (MT).

6. A multiplexer according to claim 1, characterized in that it further includes a set of wavelength converters ($CL_1, \ldots, CL_N$) to supply new carriers ($\lambda'_1, \ldots, \lambda'_N$) modulated respectively by the same modulating signals as those carried by the carriers selected by the first set of filters ($F_1^T, \ldots, F_N^T$), and a wavelength-division multiplexer which multiplexes the new carriers supplied by said set of wavelength converters.

* * * * *